United States Patent [19]
Kelley et al.

[11] 3,729,944
[45] May 1, 1973

[54] SEPARATION OF GASES
[75] Inventors: Carl S. Kelley, Bartlesville, Okla.; Frank H. Thorn, Antwerp, Belgium
[73] Assignee: Phillips Petroleum Company, Bartlesville, Okla.
[22] Filed: July 23, 1970
[21] Appl. No.: 57,493

[52] U.S. Cl. ..................62/39, 62/23, 62/24, 62/26, 260/679 A
[51] Int. Cl. ..............F25j 3/00, F25j 3/02, F25j 3/06
[58] Field of Search.....................62/23, 24, 27, 28, 62/39, 26; 260/677 A, 679 A

[56] References Cited
UNITED STATES PATENTS

| 3,119,677 | 1/1964 | Moon | 62/28 |
|---|---|---|---|
| 2,938,934 | 5/1960 | Williams | 260/677 A |
| 2,765,635 | 10/1956 | Redcay | 62/39 |
| 2,817,961 | 12/1957 | O'Connell | 62/23 |
| 3,055,183 | 9/1962 | Kniel | 62/24 |
| 3,185,182 | 6/1965 | Grossmann | 62/28 |
| 3,229,471 | 1/1966 | Palen | 62/28 |
| 3,555,836 | 1/1971 | Schramm | 260/679 A |

Primary Examiner—Norman Yudkoff
Assistant Examiner—Arthur F. Purcell
Attorney—Young and Quigg

[57] ABSTRACT

A gas-liquid mixture is introduced into a phase separation zone wherein there is effected a separation between a gas phase and its equilibrium liquid; the gas phase is required to perform a maximum of expansion work and then passed in indirect heat exchange with the gas-liquid mixture; the desired cooling of the gas-liquid mixture not completely supplied by the gas phase is supplied by a portion of the equilibrium liquid with the remaining portion of the equilibrium liquid being passed to convenient locations for further processing.

7 Claims, 1 Drawing Figure

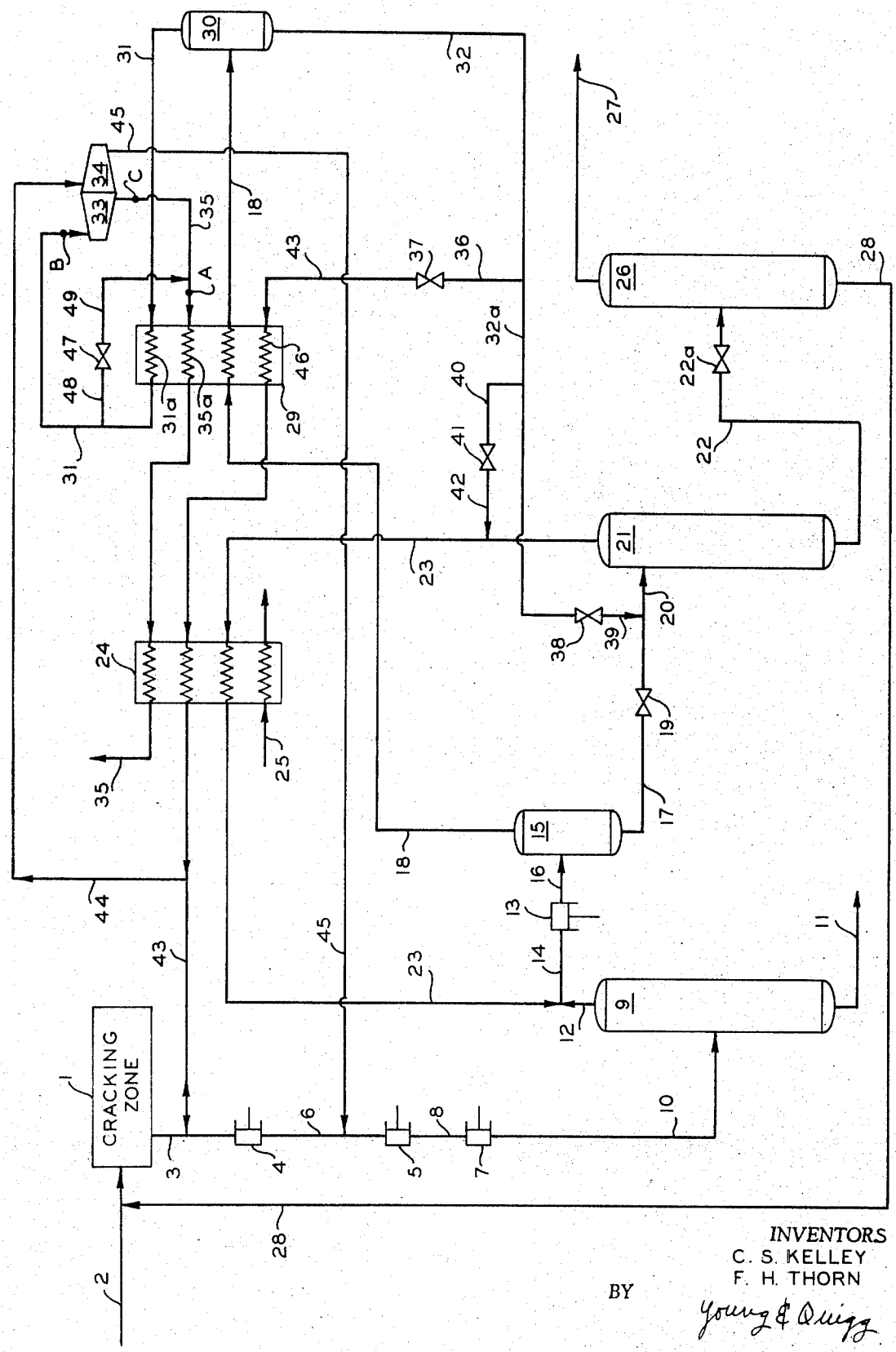

SEPARATION OF GASES

This invention relates to the separation of gases. This invention further relates to the separation of ethylene from a gaseous stream comprising carbon dioxide, hydrogen, and low-boiling hydrocarbons. This invention still further relates to the optimum use of the tail gas from an ethylene recovery unit as a refrigerant in the production of low process temperatures required in the low-temperature, low-pressure recovery of ethylene.

It is known to cool a gas under pressure to produce a condensate phase and a second gas phase and to further cool or compress and cool the second gas phase to produce still another condensate phase and still another gas phase. This gas cooling process can be continued until a residue gas of desired composition is obtained. Such a gas has been known as and is referred to herein as tail gas. At this point, it is still further known to utilize the refrigeration value of the obtained tail gas to initially cool other streams and then to require the tail gas to perform expansion work, as a result of which the gas is cooled to a low temperature, thus rendering it available for further use as a refrigerant.

A process for utilization optimum utilization of the available refrigeration value of tail gas can result in increased plant efficiency, for example in reduced horsepower required to compress incoming feed, which increase in plant efficiency can be utilized to save in utilities or to increase plant capacity. However, such a process has not been heretofore disclosed.

It is thus an object of this invention to provide an improved process for the separation of gases. It is another object of this invention to provide an improved process for the utilization of expanded tail gas as a refrigerant in an ethylene recovery process.

We have now discovered an improved process for the separation of gases which features using an expanded gas and its equilibrium liquid as refrigerants to cool other streams wherein the improvement comprises maximizing for refrigeration use the quantity of as which performs expansion work and utilizing for refrigeration only that quantity of equilibrium liquid necessary to supply refrigeration not fully supplied by the expanded gas. In gas separation processes utilizing as refrigerant a tail gas and its equilibrium liquid, which is initially under high pressure, wherein only a portion of the tail gas is expanded, it is necessary to utilize a large part, if not all, of the equilibrium liquid as a refrigerant in which case the pressure on the equilibrium liquid is reduced to a low value in order to produce the desired refrigeration effect. In such a case, the equilibrium liquid becomes so reduced in pressure that it must be returned to lower pressure levels for recompression prior to its being further processed for the separation of desirable constituent values. However, by the process of this invention the tail gas which is already of a desirable composition is required to perform a maximum of expansion work which thereby reduces its temperature to a low level and enhances its value as a refrigerant. To the extent that the tail gas is enhanced as a refrigerant, the pressure on at least a portion of the equilibrium liquid is not required to be reduced in order to produce desired refrigeration values. The portion of equilibrium liquid not utilized as a refrigerant with the consequent pressure reduction can then be introduced into convenient locations of higher pressure for further processing without need for extensive recompression. The net result is that gas compression horsepower capacity is saved while product purity and tail gas composition are not affected. The saving in horsepower, for example, can be utilized in greater process throughput. Horsepower saving in the range of 2 to 5 percent is realized when 20 to 25 percent of the equilibrium liquid is not utilized as a refrigerant.

This invention is fully explained in connection with the following drawing and description of a process for the recovery of ethylene from a cracked ethane gas stream.

Referring now to the drawing, which shows in simplified form a flow process according to the invention, a gaseous feedstream contained in line 2 and comprising essentially ethane is combined with a gaseous recycle stream contained in line 28 which is also essentially ethane and the combined streams are introduced into cracking zone 1 via line 2. Within cracking zone 1, the feed and recycle streams are subjected to heat sufficient to convert them to a cracked gas stream comprised essentially of hydrogen, methane, ethylene, ethane, propylene, propane and small amounts of higher-boiling hydrocarbons up to and including hydrocarbons having six carbon atoms per molecule. Also included in the cracked gas stream are traces of carbon dioxide and acetylene. After being quenched and cooled in cracking zone 1, the cracked gas stream contained in line 3 is combined with a recycle stream contained in line 43 and together the streams are introduced into first compression zone 4 via line 3 at a suction temperature of 96° F. and at a suction pressure of approximately 22 psia, wherein the stream is compressed, and cooled gas from first compression zone 4 is then introduced into second compression zone 5 via line 6. Prior to introduction of the gas into second compression zone 5 it is combined with recycle gas contained in line 45. The compressed and cooled gas from second compression zone 5 is then introduced into third compression zone 7 via line 8. The compressed and cooled gas from third compression zone 7 is then introduced into first fractionating zone 9 via line 10. In steps not shown in the drawing, the gas between third compression zone 7 and first fractionating zone 9 is cooled, partially condensed to a liquid, dried and subjected to treatment for the removal of carbon dioxide. Upon introduction of the gas-liquid mixture into fractionating zone 9, the mixture temperature is approximately 11° F. and mixture pressure is approximately 177 psia. The bottom product from fractionating zone 9 is removed by line 11 for other processing not shown. All of the $C_4$ hydrocarbons and heavier, approximately 25 percent of the $C_3$ hydrocarbons, and a trace of ethane are removed from the process in line 11. The overhead from fractionating zone 9 in line 12 is combined with recycle which is contained in line 23 and the combined streams are then introduced into fourth compression zone 13 via line 14. A gas is conducted from fourth compression zone 13 to first phase separation zone 15 by line 16. In steps not shown, the material between fourth compression zone 13 and flash zone 15 is partially condensed, dried and treated for the removal of acetylenes such that the material entering phase separation zone 15 in line 16 comprises essentially hydrogen, methane, ethylene and ethane at a temperature of approximately −96° F. and a pressure of approximately 335 psia.

In first phase separation zone 15 a separation occurs, producing a liquid bottoms stream 17 and a gas stream 18. Stream 17, which is under a pressure of approximately 331 psia, is comprised essentially of ethylene and ethane. Stream 17 also contains a minor amount of hydrogen, some methane and substantially all of remaining $C_3+$ hydrocarbons. The gas in line 18, having a temperature of $-96°$ F. and a pressure of approximately 331 psia, is comprised essentially of hydrogen and methane. The gas in line 18 also contains some ethylene, some ethane and trace quantities of propylene.

The liquid bottoms stream from first phase separation zone 15 is carried in line 17 to pressure-reducing valve 19 which reduces the pressure on the liquid to produce a gas-liquid mixture which, along with material introduced from line 39, is conducted by line 20 to second fractionating zone 21. The material contained in line 20 prior to its introduction to second fractionating zone 21 is under a pressure of approximately 196 psia and at a temperature of approximately $-96°$ F. In second fractionating zone 21 there is effected a separation between methane and lighter and $C_2$ hydrocarbons and heavier to thus produce a bottoms liquid stream 22 comprising essentially ethylene and ethane along with propylene and propane. The overhead stream 23 from fractionating zone 21 is a gas stream comprising hydrogen, methane, ethylene, ethane and a trace quantity of propylene. The gas in line 23, which is at a pressure of 193 psia and a temperature of $-84°$ F. when it leaves fractionating zone 21, is passed to heat exchange zone 24 wherein it is in indirect heat exchange relationship with refrigerant contained in line 25. The gas in line 23, after having passed through heat exchanger 24 wherein it is heated to a temperature of $84°$ F., is passed to a point upstream of fourth compression zone 13 where it is combined with the overhead from first fractionating zone 9 for introduction by line 14 into fourth compression zone 13. The refrigerant in line 25, which is being cooled in heat exchanger 24, is representative of separate propylene and ethylene refrigeration systems not shown which are used to cool the process streams designated by the numerals 8, 10 and 16.

The bottoms product from second fractionating zone 21, which was previously described, is introduced into third fractionating zone 26. Although the material in line 22 at a point near the bottom of second fractionating zone 21 is at a temperature of approximately $-28°$ F. and a pressure of approximately 196 psia, it is expanded to a pressure of approximately 65 psia and a temperature of approximately $-86°$ F. prior to its introduction into third fractionating zone 26 upon passing through valve 22a. In fractionating zone 26 there is effected a separation between the desired ethylene product carried in line 27 and a bottom product comprised essentially of ethane carried in line 28. The ethylene product in line 27 leaves fractionator 26 at a temperature of $-101°$ F. and at a pressure of approximately 65 psia. After the ethylene product in line 27 is passed through heat exchangers, not shown, it is removed for other processing. The bottom product from fractionating zone 26 contained in line 28 is comprised essentially of ethane. This line also contains trace quantities of ethylene, propylene and propane. The temperature of the bottoms product from fractionating zone 26 is approximately $-65°$ F. and the pressure is approximately 65 psia. This bottoms product is used as an ethane recycle and, prior to its being combined with feed gas in line 2 upstream of cracking zone 1, it is passed in indirect heat exchange with various streams not shown and is subsequently combined with stream 2 at a temperature of approximately $85°$ F.

The gas overhead from first phase separation zone 15 contained in line 18, at a pressure of 331 psia and a temperature of $-96°$ F., is introduced into heat exchange zone 29 wherein it is passed in indirect heat exchange relationship with hereinafter-described refrigerating streams and partially condensed and cooled to a temperature of $-181°$ F. and then introduced into second phase separation zone 30. In second phase separation zone 30, separation occurs which produces an overhead tail gas phase contained in line 31 and a bottoms equilibrium liquid phase contained in line 32. The tail gas in line 31 leaves second phase separation zone 30 at a temperature of $-181°$ F. and a pressure of approximately 330 psia. It is comprised essentially of hydrogen and methane and has trace amounts of ethylene and ethane. The tail gas passes for a first time through heat exchange zone 29 in coil 31a wherein it is in heat exchange relationship with the fluids in lines 18, 35 and 43. The tail gas is then passes through expansion zone 33 wherein it performs expansion work by compressing gas contained in recycle compression zone 34, which expansion work causes the temperature of the tail gas to be substantially reduced. From expansion zone 33 the tail gas is conducted in line 35 to heat exchange zone 29 and passes for a second time through heat exchange zone 29 in coil 35a, wherein it is in indirect heat exchange with the gas in line 18; it is subsequently passed out of heat exchange zone 29 and introduced into heat exchange zone 24, wherein it is in indirect heat exchange with line 25 and passed out of heat exchange zone 24 at a temperature of approximately $85°$ F. and from there passed to further processing, not shown.

The bottoms equilibrium liquid from second phase separation zone 30 contained in line 32 has a temperature of approximately $-181°$ F. and a pressure of 330 psia and is comprised essentially of ethylene, methane and ethane with minor amounts of hydrogen and propylene. Approximately 75 to 80 percent of the equilibrium liquid contained in line 32 is passed through line 36 to pressure-reducing valve 37; and approximately 20 to 25 percent of the equilibrium liquid contained in line 32 is passed through line 32a and pressure-reducing valve 38, wherein the pressure on the equilibrium liquid is reduced, and from pressure-reducing valve 38 the resulting fluid is passed by line 39 and combined with the feed to second fractionating zone 21 in line 20 at a point downstream of pressure-reducing valve 19, which is intermediate first phase separation zone 15 and second fractionating zone 21.

In another aspect of this invention, 20 to 25 percent of the equilibrium liquid contained in line 32 is passed through lines 32a and 40 and through pressure-reducing valve 41, wherein the pressure of the equilibrium liquid is reduced, and the equilibrium liquid is subsequently introduced by line 42 into line 23 which contains the overhead product from section fractionating zone 21.

The equilibrium liquid passing through pressure-reducing valve 37 is introduced into heat exchange zone 29 by line 43 at a temperature of approximately $-197°$ F. wherein it is passed in indirect heat exchange relationship with the gas material from first phase separation zone 15 which is contained in line 18. After undergoing heating in exchange zone 29, the fluid is passed to heat exchange zone 24 by line 43 wherein it is passed in heat exchange relationship with the material contained in line 25 and thereby heated to a temperature on the downstream side of heat exchange zone 24 of approximately 84° F. From heat exchange zone 24 a portion of the fluid, now in gas phase, can be recycled by line 43 to a point upstream of first compression zone 4 if desired, wherein it is combined with the cracked gas contained in line 3 and the remaining fluid is introduced into recycle compression zone 34 by line 44. In recycle compression zone 34, which operates in parallel with first compression zone 4, the gas, which has the composition of the fluid in line 32, is compressed and then recycled to a point upstream of second compression zone 5 by line 45 and combined with the gas contained in line 6.

The gas in line 18 passing through heat exchange zone 29 is cooled by indirect heat exchange with the tail gas in coil 35a and with a portion of the equilibrium liquid contained in line 32 which is passed through pressure-reducing valve 37 and then through heat exchange zone 29 in oil 46. The temperature of the gas-liquid mixture contained in line 18 upstream of second phase separation zone 30 as a result of having passed through heat exchange zone 29 is controlled generally by the temperature of materials contained in lines 35 and 43 upstream of heat exchange zone 29 and specifically by the temperature in line 35 upstream of heat exchange zone 29. Because the temperature in lines 31 and 43 upstream of heat exchange zone 29 is substantially fixed by upstream process conditions, the control of temperature in line 18 downstream of heat exchange zone 29 is maintained by variation in the temperature and quantity of material in line 35 at point A upstream of heat exchange zone 29. Thus, if the temperature decrease across expansion zone 33 between points B and C is sufficient to cause a lower temperature at point A than that required to maintain the temperature desired in line 18 upstream of second phase separation zone 30, then tail gas can be diverted around expansion zone 33 through valve 47 by line 48 and introduced into line 35 by line 49 upstream of point A where the relative warm tail gas before passing through expansion zone 33 is mixed with that tail gas passing through expansion zone 33 in order to provide the temperature required at point A. By this invention, it is contemplated that the refrigeration effect of the tail gas in expansion zone 33, and coil 35a be maximized, and the equilibrium fluid passed through coil 46 in just sufficient quantity to supply the refrigeration requirement not fully met by the tail gas. Accordingly, in the ideal situation, the entire tail gas stream passes through expansion zone 33 with none of the tail gas passing through lines 48 and 49 and valve 47. To approach the ideal situation, recycle compression zone 34 is loaded to the maximum extent. In order to obtain maximum loading, At least a large portion, preferably all, of the equilibrium liquid passing through pressure-reducing valve 37 is ultimately passed through recycle compression zone 34 by way of line 44.

In another aspect of this invention, all of the equilibrium liquid passing through pressure-reducing valve 37 is passed through recycle compression zone 34 by way of line 44.

In still another aspect of this invention, all of the equilibrium liquid passing through pressure-reducing valve 37 as well as up to 10 percent of cracked gas from line 3 is passed through recycle compression zone 34 by way of lines 43 and 44.

By requiring expansion zone 33 in combination with recycle compression zone 34 to provide the maximum refrigeration effect available in tail gas 31, the recycle gas load to first compression zone 4 is substantially reduced. Also, by requiring expansion zone 33 and recycle compression zone 34 to provide the maximum refrigeration effect available in tail gas 31, the quantity of equilibrium liquid passing through pressure-reducing valve 37 and coil 46 is also reduced. The portion not passed through valve 37 and coil 46 is not greatly reduced in pressure and is therefore introduced into a higher pressure level portion of the process and is subsequently compressed in fourth compression zone 13. Thus, by switching at least a portion of the cooling requirement of coil 46 to coil 35a, the load on first, second, and third compression zones 4, 5, and 7 is reduced in proportion to the quantity of equilibrium liquid passed to either one of lines 20 or 23.

To further illustrate our invention, calculations where made simulating the operations of an ethylene recovery process as herein described. The Base Case calculations simulated operations according to the art wherein the refrigeration value of the tail gas was not maximized. In the Base Case, the entire equilibrium liquid contained in line 32 was passed through coil 46 with 75 percent of that passing through compressor 34 and eventually to second stage compression at 5 with the remaining 25 percent passing through first stage compression at 4.

The calculations for Cases A, B, C and D simulated operations according to our invention wherein the refrigeration value of the tail gas was maximized. In all of Cases A, B, C and D, only 80 percent of the equilibrium liquid in line 32 was passed through coil 46, with the remaining 20 percent entering line 20 in Cases A and C and entering line 23 in Cases B and D. Likewise, in all of Cases A, B, C and D, none of the equilibrium fluid passing through coil 46 was passed through first stage compression at 4; instead, it was all passed through compression zone 34 and eventually to second stage compression at 5. Additionally, in Cases C and D, 8.27 percent of the cracked gas in line 3 was passed through compressor 34 via lines 43 and 44.

The results of the calculations are summarized in Tables 1 and 2, below. Table 2 provides more detailed results of the calculations for Case C in which the temperature, pressure, and composition of the principle process streams are shown. It will be noted that the identity of the streams, whose compositions are given in both of Tables 1 and 2, keyed to the drawing. Thus, for example, the composition of the stream designated by the numeral 2 in the drawing is given in Tables 1 and 2 in the columns referring to stream 2.

From Table 1 it will be seen that with very little, if any, change in the feed, product, or tail gas streams as between the Base Case and Cases A, B, C, and D, there is a saving in horsepower with respect to the Base Case when the refrigeration value of the tail gas is maximized. That the refrigeration value of the tail gas was maximized can be seen from the fact that virtually all (95 percent plus) of the available temperature drop across the expander 33 in Cases A, B, C and D was utilized as compared to the Base Case, where less than half of the available refrigeration value of the tail gas was used.

TABLE 1

| | Feed-stream line 2, mols/hr., ethane | Product stream line 27, mols/hr., ethylene | Tail gas stream line 31, mols/hour | | | | Total horse-power required | Cracked gas compressor feed rate, MMSCFD | | | | Temperature drop across expander 33, °F. | | | H. power saved compared to base case, percent |
|---|---|---|---|---|---|---|---|---|---|---|---|---|---|---|---|
| | | | Hydrogen | Methane | Ethylene | Ethane | | Stage 1, unit 4 | Stage 2, unit 5 | Stage 3, unit 7 | Stage 4, unit 13 | Available, B to C | Required B to A | | |
| Base case: All fluid in line 32 passes through coil 46, 75% of fluid through coil 46 to compressor 34, 25% to compressor 4 | 2,789.2 | 2,245.6 | 2,383.6 | 511.8 | 37.9 | 5.1 | 17,533.8 | 69.3 | 75.7 | 75.7 | 93.6 | 80.5 | 30.8 | | |
| Case A: 80% of fluid in line 32 passes valve 37 and coil 46 with the remaining 20% passing lines 32a and 39 into line 20. All fluid passing coil 46 passes through compressor 34 | 2,788.8 | 2,246.7 | 2,383.6 | 512.0 | 37.7 | 5.2 | 17,076.4 | 67.0 | 73.8 | 73.8 | 91.4 | 82.0 | 78.3 | 2.6 |
| Case B: Same as A except the 20% in line 32a passes via valve 41 into line 23 | 2,788.9 | 2,246.3 | 2,383.6 | 512.0 | 37.9 | 5.1 | 17,129.8 | 67.0 | 73.8 | 73.8 | 92.9 | 82.0 | 78.5 | 2.3 |
| Case C: Same as A except in addition 8.27% of cracked gas in line 3 passes lines 43 and 44 into compressor 34 | 2,788.8 | 2,246.7 | 2,383.6 | 512.0 | 37.7 | 5.2 | 16,797.6 | 61.6 | 73.7 | 73.7 | 91.4 | 81.9 | 78.6 | 4.2 |
| Case D: Same as B except in addition 8.27% of cracked gas in line 3 passes lines 43 and 44 into compressor 34 | 2,788.9 | 2,246.3 | 2,383.6 | 512.0 | 37.9 | 5.1 | 16,848.8 | 61.6 | 73.8 | 73.8 | 92.9 | 82.0 | 78.5 | 3.9 |

TABLE 2
Case C

| Stream | 2 | 3 | 10 | 11 | 16 | 18 | 20 | 22 | 23 | 27 | 28 | 31 | 32 |
|---|---|---|---|---|---|---|---|---|---|---|---|---|---|
| Stream composition, moles per hour: | | | | | | | | | | | | | |
| CO₂ | 0.0 | 4.5 | 0.0 | 0.0 | 0.0 | 0.0 | 0.0 | 0.0 | 0.0 | 0.0 | 0.0 | 0.0 | 0.0 |
| H₂ | 0.0 | 2,414.6 | 2,396.1 | 0.0 | 2,431.2 | 2,390.8 | 0.0 | 0.0 | 41.8 | 0.0 | 0.0 | 2,383.6 | 7.2 |
| CH₄ | 0.0 | 516.8 | 725.9 | 0.0 | 1,131.8 | 779.1 | 41.8 | 0.0 | 406.1 | 0.0 | 0.0 | 512.0 | 267.1 |
| C₂H₂ | 0.0 | 2.6 | 2.6 | 0.0 | 0.0 | 0.0 | 0.0 | 0.0 | 0.0 | 0.0 | 0.0 | 0.0 | 0.0 |
| C₂H₄ | 0.0 | 2,340.4 | 2,744.6 | 0.0 | 2,930.7 | 571.9 | 2,465.8 | 2,277.9 | 187.9 | 2,246.7 | 31.1 | 37.7 | 534.2 |
| C₂H₆ | 2,788.8 | 1,679.6 | 1,822.7 | 2.0 | 1,897.9 | 205.2 | 1,732.7 | 1,659.6 | 73.1 | 0.7 | 1,658.9 | 5.2 | 200.4 |
| C₃H₆ | 0.0 | 36.1 | 36.1 | 7.0 | 29.3 | 0.6 | 28.8 | 28.6 | 0.2 | 0.0 | 28.6 | 0.0 | 0.6 |
| C₃H₈ | 0.0 | 3.6 | 3.6 | 1.1 | 2.4 | 0.0 | 2.4 | 2.4 | 0.0 | 0.0 | 2.4 | 0.0 | 0.0 |
| C₄H₆ | 0.0 | 5.4 | 5.4 | 5.4 | 0.0 | 0.0 | 0.0 | 0.0 | 0.0 | 0.0 | 0.0 | 0.0 | 0.0 |
| C₄H₈ | 0.0 | 28.4 | 28.3 | 28.3 | 0.0 | 0.0 | 0.0 | 0.0 | 0.0 | 0.0 | 0.0 | 0.0 | 0.0 |
| C₄H₁₀ | 0.0 | 10.4 | 10.3 | 10.3 | 0.0 | 0.0 | 0.0 | 0.0 | 0.0 | 0.0 | 0.0 | 0.0 | 0.0 |
| C₅ | 0.0 | 17.3 | 17.1 | 17.1 | 0.0 | 0.0 | 0.0 | 0.0 | 0.0 | 0.0 | 0.0 | 0.0 | 0.0 |
| C₆ | 0.0 | 96 | 11 | | | | | | | | | | |
| Stream temperature, °F | | 22 | 177 | | 335 | 331 | 196 | -86 | 83 | -102 | -65 | -181 | -181 |
| Stream pressure, p.s.i.a | | | | | | | 65 | 65 | 198 | 65 | 65 | 330 | 330 |

Reasonable variations and modifications of this invention can be made, or followed, in view of the foregoing disclosure, without departing from the spirit or scope thereof.

That which is claimed is:

1. In a process for the separation of gases comprising introducing a first gas-liquid stream into a first phase separation zone wherein a phase separation produces a first gas stream and a first liquid stream, introducing said first liquid stream into a first fractionating zone wherein there is produced a second liquid stream and a second gas stream, introducing said first gas stream into a heat exchange zone wherein said first gas stream is cooled and partially condensed to produce a second gas-liquid stream, introducing said second gas-liquid stream into a second phase separation zone wherein a phase separation produces a tail gas and a third liquid stream, passing for a first time said tail gas through said heat exchange zone, thereafter requiring said tail gas to perform expansion work and then passing for a second time said tail gas, now expanded, in indirect heat exchange relationship with said first gas stream in said heat exchange zone, and directly passing said third liquid stream from said second phase separation zone in indirect heat exchange relationship with said first gas stream in said heat exchange zone; the improvement which comprises controllably diverting at least a portion of said third liquid stream for said indirect heat exchange relationship with said first gas stream and further treating said diverted portion of said third liquid stream for the separation of desirable constituent values.

2. The process of claim 1 wherein said portion of said third liquid stream is combined with said first liquid stream and introduced into said first fractionating zone.

3. The process of claim 1 wherein said portion of said third liquid stream is combined with said second gas stream.

4. The process of claim 2 wherein said first gas-liquid stream is comprised essentially of hydrogen, methane, ethylene, and ethane, said second liquid stream is comprised essentially of ethylene and ethane, and said tail gas stream is comprised essentially of hydrogen and methane.

5. The process of claim 4 wherein a gaseous feedstream comprising ethane is introduced into a cracking zone wherein said feedstream is subjected to heat sufficient to convert it to a cracked gas stream comprised of carbon dioxide, hydrogen, methane, acetylene, ethylene, ethane, propylene, propane, and higher-boiling hydrocarbons up to hydrocarbons having six carbon atoms per molecule, introducing said cracked gas stream into a compression zone wherein said cracked gas stream is compressed, cooled and condensed to form a fourth liquid stream, introducing fourth liquid stream into a second fractionating zone wherein a fifth liquid stream comprising $C_3$ and $C_4$ hydrocarbons and a fourth gas stream are produced, and introducing said fourth gas stream into a second compression zone wherein said fourth gas stream is compressed, cooled, and partially condensed to form said first gas-liquid stream.

6. The process of claim 5 wherein at least a portion of said third liquid stream passing in said heat exchange zone is thereafter introduced into a third compression zone wherein said third liquid stream is compressed as a result of the expansion work performed by said tail gas.

7. The process of claim 6 wherein at least a portion of said cracked gas is compressed in said third compression zone.

* * * * *